W. PERTZSCH.
POTATO SORTER.
APPLICATION FILED APR. 2, 1909.
943,097.
Patented Dec. 14, 1909
2 SHEETS—SHEET 2.
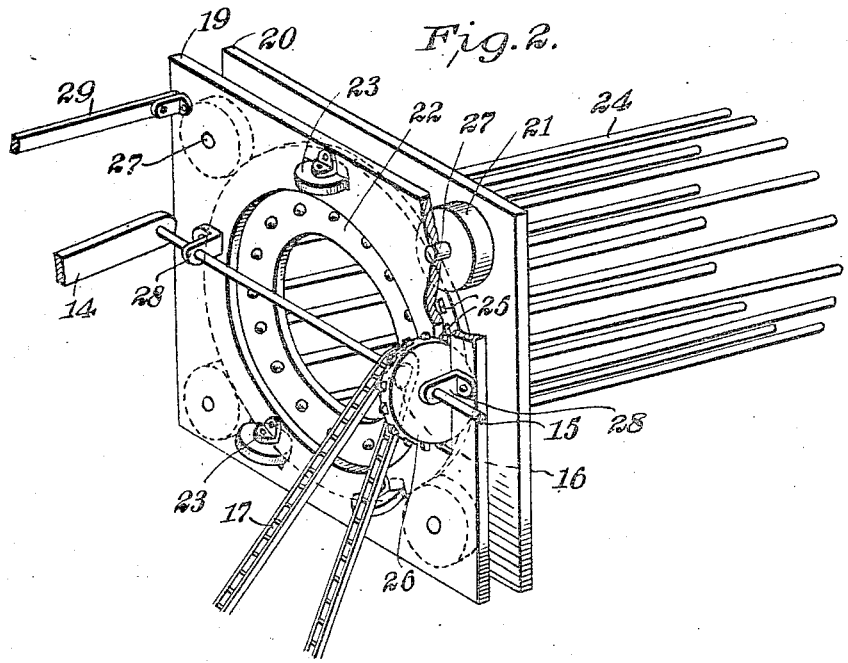
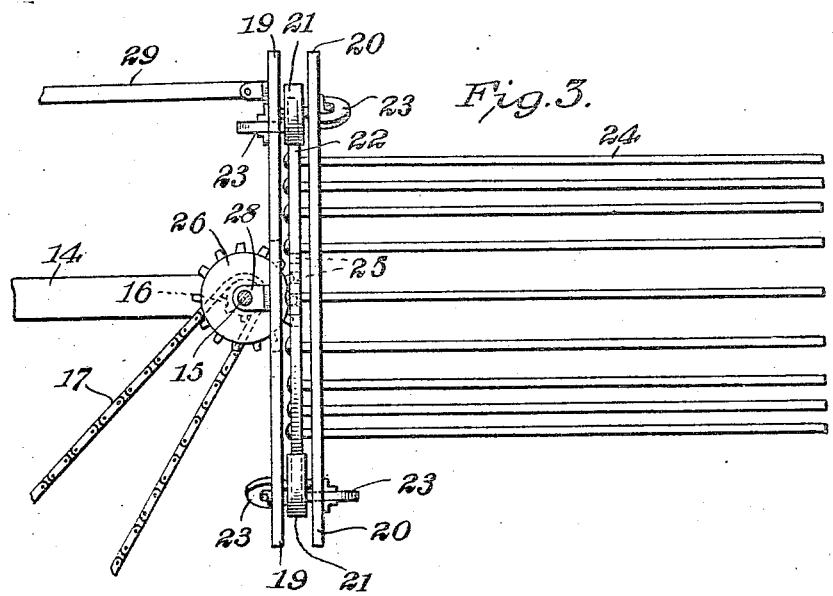

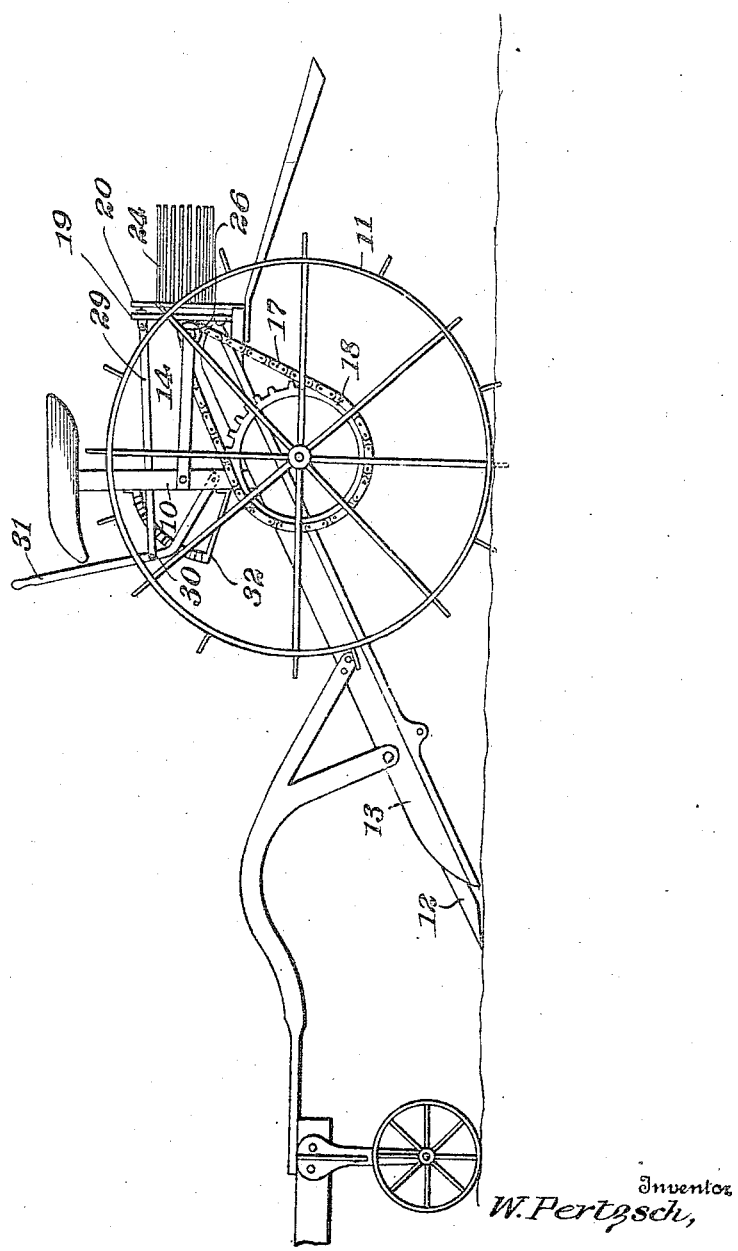

UNITED STATES PATENT OFFICE.

WALTER PERTZSCH, OF ONALASKA, WISCONSIN.

POTATO-SORTER.

943,097.  Specification of Letters Patent.  Patented Dec. 14, 1909.

Application filed April 2, 1909. Serial No. 487,390.

*To all whom it may concern:*

Be it known that I, WALTER PERTZSCH, citizen of the United States, residing at Onalaska, in the county of La Crosse and State of Wisconsin, have invented certain new and useful Improvements in Potato-Sorters, of which the following is a specification.

This invention relates to elevators and has especial reference to an attachment to be applied to a potato digger.

An object of this invention is to provide a potato digger with an attachment whereby the potatoes may be sorted from the soil as the same are delivered from the elevator which raises the potatoes from the lifting shovel.

The invention has for another object the provision of an improved sorter of this character which may be adjusted in various angles to regulate the feed of the potatoes through the same during the operation of the machine.

The invention further provides a device which will receive the potatoes and soil when the same is in a moist or dry condition and will effectually operate under either of such conditions and thus will be prevented from clogging or interrupting the effectual operation of the machine.

A still further object of the invention is the provision of a sorter which is applicable to machines of various construction, it being necessary only to provide a pair of arms and operative connection between the same.

For a full understanding of the invention reference is to be had to the following description and accompanying drawings, in which:—

Figure 1 is a side elevation of a potato digger having the improved attachment applied thereto. Fig. 2 is a detailed perspective view of the sifter detached, and Fig. 3 is a side elevation of the sifter detached.

Corresponding and like parts are referred to in the following description and indicated in all the views of the drawings by the same reference characters.

Referring to the drawings the numeral 10 designates a potato digger frame which is provided with the supporting wheels 11, the shovel 12 and an elevator 13 which is extended upwardly and rearwardly from the shovel 12 to a point at the rear end of the frame 10. The frame 10 carries a pair of rearwardly projected arms 14 in which a transverse shaft 15 is mounted and which is rotatably actuated by the employment of a sprocket 16 which carries a chain 17, the chain 17 being forwardly extended and engaged over a large sprocket 18 carried upon one of the driving wheels 11. The sprocket 16 is arranged upon the shaft 15 in alinement with the large sprocket 18 and is adapted to actuate the improved sorter.

The sorter comprises a pair of plates 19 and 20 which are of substantially rectangular formation and which are provided adjacent their opposite corners with rollers 21 between which is rotatably disposed a disk 22 which is centrally apertured and which is engaged about its edge against the peripheries of the rollers 21. The disk 22 is centered between the plates 19 and 20 by the employment of guide rollers 23 which are carried in the plates 19 and 20, the plates 19 and 20 being slotted for the reception of the same, and which engage against the opposite sides of the disk 22 adjacent the outer edge of the same. The guide rollers 23 may be disposed in practically any desired location in the plates 19 and 20, but are preferably arranged as disclosed in the drawings, in which the plate 20 carries two of the same which are positioned in spaced relation at the upper end thereof and which coöperate with a roller carried centrally of the upper edge of the plate 19 upon the operative side of the disk 22 thereby retaining the disk centrally of the plates at its upper portion. The lower ends of the plates 19 and 20 carry the guide rollers 23 in opposite arrangement, namely, the plate 19 is provided with a pair of the rollers 23 spaced apart therein and each co-acts with a centrally disposed roller carried by the plate 20. The plates 19 and 20 are centrally and circularly apertured to admit of the extending inwardly of the inner edge of the disk 22 to admit of the extension of a plurality of prongs 24 which are secured to the disk 22 adjacent the inner edge of the same and extended rearwardly through the plate 20. The prongs 24 form a sifter or sorter for the potatoes which are introduced to the plate 19 within the same and admit of the passage of the soil between the prongs 24 during the rotation of the disk 22.

The disk 22 is actuated by the formation of a rack 25 upon the inner face of the same which is meshed with a gear wheel 26 carried upon the shaft 15 and extended through a slot formed through the plate 19 to admit of the meshing of the same. The gear 26 is rigidly carried upon the shaft 15 and is thus caused to rotate through the medium of the chain 17 and sprocket 16 which receive their motions from the large sprocket 18 carried upon the drive wheel 11. The plates 19 and 20 are secured in parallel relation through the medium of the pins 27 which are extended through and between the same to support the rollers 21, although any additional braces or supporting means may be employed. The plate 19 is provided with forwardly projected lugs 28 which are apertured for the reception of the opposite ends of the shaft 15 therethrough in order to pivotally support the plates 19 and 20 upon the shaft 15. The lugs 28 are positioned intermediately upon the plate 19 adjacent the inner edge of the same and thus form a central pivot for the sorting device. Forwardly extending from the upper opposite corners of the plate 19 are rods 29 which are engaged with a transverse rotary shaft 30 which is actuated by means of a hand-lever 31 to swing the plates 19 and 20 in various angles in order to raise or lower the rear extremities of the prongs 24 to cause the feeding of the potatoes or other substances through the same at various degrees of speed.

It will thus be noted that in thus positioning the plates 19 and 20 the upper end of the elevator 13 terminates within the aperture formed through the plate 19 and thus feeds the potatoes which are carried upwardly thereby through the plate 19 and upon the inner faces of the prongs 24.

When the digger is actuated the drive wheels 11 are rotated and the shaft 15 is driven through the medium of the chain 17 and sprockets 18 and 16 respectively. This rotation of the shaft 15 causes the gear 26 to revolve and to rotate the disk 22 by reason of its meshing engagement therewith. Simultaneously the elevator 13 is actuated to raise quantities of the soil and potatoes as they are lifted by the shovel and to carry the same to the plate 19 where they are deposited through the disk 22 upon the prongs 24. The rearward motion transmitted to the prongs 24 causes the jarring and settling of the material placed therein and consequently separates the soil from the potatoes and permits the soil to drop downwardly between the prongs. The lever 31 is provided in the usual manner with the segment 32 by means of which the same is retained at various adjusted angles and which regulates the angle of the prongs 24 through the medium of the rods 29. It is noted from this construction and operation that when the prongs 24 are deflected rearwardly at a substantial angle the material which is placed in the forward end of the same will travel rapidly and pass out of the rear end into receptacles or the like which may be provided for the same.

Having thus described the invention what is claimed as new is:—

1. In a device as specified, the combination with a digger of a pair of centrally apertured plates hingedly disposed at the rear end of said digger, an apertured disk rotatably disposed between said plates, a plurality of prongs rearwardly extended from the inner edge of said disk through the rear of said plates, means disposed between said disk and said digger for actuating said disk and rods disposed between said digger and said forward plate for tilting the same into various angles.

2. In a device as specified the combination with a potato digger of a pair of centrally apertured plates disposed at the rear end of the said digger and adapted to receive potatoes from said digger, and an apertured disk rotatably disposed between said plates, a plurality of prongs rearwardly projected from the inner edge of said disk through the rear of said plate, rollers mounted adjacent the opposite corners between said plates to support said disk, guide rollers disposed through said plates and engaged with said disk to secure the same centrally thereof, lugs forwardly extended from the intermediate portion of said first plate, a shaft rotatably disposed through said lugs, a gear mounted on said shaft and extended through said first plate, a rack formed on the face of said disk to mesh with said gear, a sprocket mounted on said shaft and connected to said digger to rotate said shaft and means carried by said digger for tilting said plates into various angles.

3. A device as specified comprising a pair of plates, rollers positioned adjacent the corners between said plates, a disk loosely mounted on said rollers, a plurality of prongs rearwardly extended in said disk, said disk and said plates having apertures centrally formed therethrough for the reception of potatoes from the digger, means carried to the forward of said plates to actuate said disk and means connected to said plates to adjust said plates in various angles.

4. In a device as specified the combination with a digger of a pair of spaced plates hingedly disposed in parallel at the rear end of said digger, means carried by said digger for retaining said plates in various angles, said plates being centrally apertured a disk centrally apertured and positioned between said plates adapted for rotation in such position, a plurality of prongs disposed in spaced relation adjacent the inner edge of said disk and extended rearwardly therefrom and means disposed between said digger and said disk for rotating said disk by the actuation of said digger.

5. In a device as specified the combination with a digger of a pair of plates vertically disposed in parallel transversely of said digger, a disk rotatably engaged between said plates, rollers carried by said plates to retain said disk in position, a plurality of prongs rearwardly extended from the inner edge of said disk, said plates and said disk being centrally apertured, a shaft transversely disposed across one of said plates, means carried by said shaft for engagement with said disk to rotate the same, means carried by said shaft and connected to said digger for rotating said shaft and rods carried by said plates and connected to said digger for moving said plates into various vertical angles.

6. In a device as specified the combination with a digger of a pair of plates carried by said digger, a disk rotatably mounted between said plates, said plates and said disk being apertured, prongs rearwardly extended from said disk through one of said plates, rollers disposed between the opposite corners of said plates to retain said disk in position, guide rollers positioned through said plates and engaged with said disk, a shaft mounted transversely of the forward of said plates, a gear on said shaft extended through said forward plate and engaged with said disk, a rack on said disk for engagement with said gear, means disposed between said digger and said shaft to actuate the same and rods carried by said digger and connected to said forward plate for directing said disk into various angles.

In testimony whereof I affix my signature in presence of two witnesses.

WALTER PERTZSCH. [L. S.]

Witnesses:
E. D. LOOMIS,
W. C. WINTER.